Figure 1:
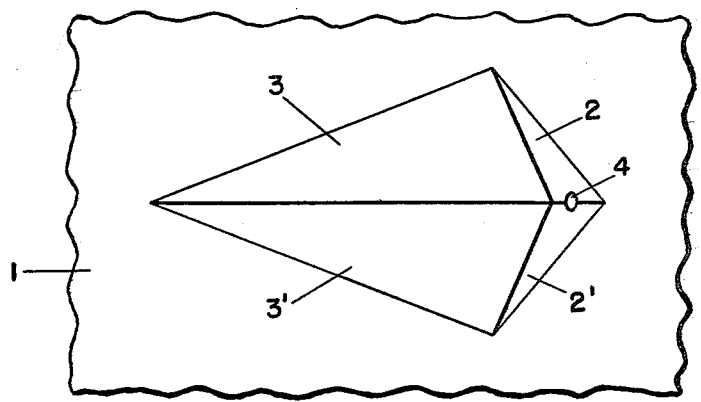

3,083,568
DEVICE USED IN CONNECTION WITH SHIP LOG BASED ON MEASUREMENT OF THE DYNAMIC PRESSURE
Gunnar Söredal, Stockholm, Sweden, assignor to Svenska Ackumulator Aktiebolaget Jungner, Stockholm, Sweden, a corporation of Sweden
Filed May 14, 1959, Ser. No. 813,091
Claims priority, application Sweden May 14, 1958
5 Claims. (Cl. 73—181)

This invention relates to apparatus for measuring the rate of a ship's motion through the water and has for an object the provision of a device used in connection with ship log based on measurement of the dynamic pressure or speed pressure as it is sometimes called.

Generally, in connection with ship log based on measurements of dynamic pressure, the intake for the conduit transmitting the dynamic pressure to the registering elements of the log within the ship consists of a tube with a free orifice facing in the normal or forward direction of movement of the ship. This tube, generally referred to as the "Pitot-tube" measures the velocity of the water and as a rule extends considerably outside the plating or hull of the ship. The reason for this is that a layer of water, usually referred to as the "boundary layer" is dragged along with the ship when the latter moves through the water due to the friction against the plating. Due to the friction between the molecules of the water, the thickness of this boundary layer gradually increases in the direction towards the stern of the ship. The thickness of the boundary layer also varies with the speed of the ship. It will be seen that if the speed pressure were to be measured within the boundary layer, the value obtained would be lower than that corresponding to the speed of the ship. In addition, this low value obtained would not be proportional to the square of the speed and this would introduce further errors into the speed measurement as the construction of the registering elements are normally based on said proportionality. For certain technical reasons connected with the interior construction of the ship, the Pitot-tube is, as a rule, located at a point about one-third of the length of the ship from the stern. Here the boundary layer is so thick that the Pitot-tube must have a considerable length in order to guarantee that a reliable value of the speed pressure will be obtained.

Thus, it will be seen that a Pitot-tube having a length sufficiently great to extend a substantial distance outside the hull so as to clear the boundary layer can be easily damaged under certain conditions. In order to protect the Pitot-tube in ports and other places where there is insufficient depth of water, it has been the practice heretofore to elevate the Pitot-tube. To accomplish this, the Pitot-tube has been displaceably mounted in the bottom of the ship where it can be controlled from the engine room. There are certain circumstances and conditions, however, where the Pitot-tube is easily damaged even though there is a sufficient depth of water. One example of such case exists when the ship is sailing through ice.

The device according to the present invention consists of a considerably simplified arrangement in comparison with the Pitot-tube intake of the conventional type and it insures the proper function of the log under all types of conditions, both favorable and unfavorable. In accordance with the present invention, there is substituted for the Pitot-tube a small chamber, having an intake opening, which extends only slightly outside the actual ship's hull and is firmly attached to it. The intake opening is turned in the normal direction of movement of the ship for the inlet of sea water and the chamber is provided with another opening for the attachment of a piping for transmitting the dynamic pressure to within the ship's hull. The small chamber at its forward end is restricted by two walls which form an angle, the bisectional plane of which coincides with the center bulkhead of the ship or with a plane, which is parallel to said bulkhead, or intersects the same or its extension along a horizontal line. It has been found that by attaching such small chamber sufficiently far forward on the ship's hull and by providing such chamber with such specific shape, then fully satisfactory results are obtained when measuring the speed pressure.

Figure 2:
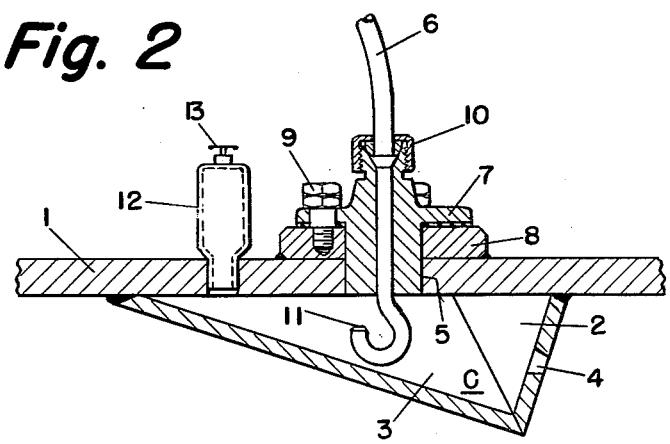

For further objects and advantages of the invention reference is to be had to the following detailed description taken in conjunction with the accompanying drawings, in which:

FIG. 1 shows a plan view of an embodiment of the invention as viewed from underneath a ship and FIG. 2 shows a sectional view of the same embodiment as viewed from the side.

Referring to the FIGS. 1 and 2, there is illustrated a small chamber C which protrudes from the plating 1 below the water line of a ship. The small chamber C is restricted by the plating 1 which forms one wall of the chamber and by walls 2, 2', 3 and 3'. The small chamber C is provided with an opening 4 at the junction between walls 2 and 2' for the entry of sea water. The chamber C is also provided with another opening 5 extending through the plating 1 for attachment of a piping 6 for transmitting the dynamic pressure to the registering elements of the log. The piping 6 is attached by a nut 10 to one side of a flange 7 which is in turn tightly attached by means of bolts 9 to washer 8. The washer 8 is in alignment with the opening 5 and is welded to the interior side of the plating 1. A tube 11 extends into the chamber C from the other side of flange 7 and is soldered thereto. The end of the tube 11 within the chamber C is bent in such a way that its orifice is turned upwards, as shown in FIG. 2. The purpose of this is to prevent bubbles of air, which might collect in the chamber, from getting into the piping 6 whereby disturbances would develop in the pressure registering elements. As a further precaution against the occurrence of such disturbances, there is provided a container 12 which is connected to the small chamber C for collecting any entrapped air. Such entrapped air may be discharged from the container 12 by means of a valve 13.

It has been found that when suitable dimensions are given to the small chamber C and such chamber is positioned at a suitable point on the hull, reliable or true values of the dynamic or speed pressure are obtained. In this connection it is necessary that the chamber C be so constructed that the dimension or distance from the opening 4, FIG. 2, to the plating 1 exceeds the thickness of the boundary layer at that point. It will be apparent that further fixed relations cannot be stated and they will need to be established by means of trials. The reason for this is that these relations depend on many factors varying from ship to ship, such as the shape of the hull, the surface structure of the plating and other physical differences. It is a general rule, however, that the small chamber C should be arranged as far forward of the ship as will be considered possible for practical reasons.

It has further been found that maximum accuracy in measurements will be obtained if the small chamber C is restricted at its forward end by two walls which form an angle. This probably depends on suitable streaming conditions being obtained thereby around the opening 4. This angle, which preferably is in the order of 90°, should be arranged in such a way that its bisectional plane coincides with the center longitudinal bulkhead of the ship or with a plane which is parallel to the bulkhead or intersects it or its extension along a horizontal line.

Stated differently, the bisectional plane is such that it intersects the ship's hull along a substantially horizontal line which is parallel to the center line of the ship. The center line of the ship is defined as the vertical plane of symmetry of the hull from stem to stern and the center longitudinal bulkhead of a ship coincides with the plane of the center line. The center of the opening 4 should likewise be in such bisectional plane. It has also been found that the opening 4 should taper outwards in the direction towards the interior of the small chamber C to provide maximum accuracy in measurements.

The small chamber C is made from a strong structural material such as steel and in the embodiment shown in the drawing it has been made from two pieces of angle bar, 2, 2' and 3, 3', which have been welded together and welded therearound to the plating 1. As shown in FIG. 1, the forward end walls 2, 2' are flat and they intersect at a forward edge, FIG. 2, which extends at an obtuse angle from the ship's hull or plating 1. This construction is simple and rugged and gives a suitable shape to the chamber C.

It is desirable to connect an additional piping to the small chamber C by means of which the chamber may be blown or sucked clean from sludge, ice and possible precipitates, when necessary. This may be provided by way of a suitable fitting on valve 13. It is further desirable in some cases to provide the piping 6 and its connection with isolation and/or some kind of heating equipment such as a heating coil in order to prevent freezing in the winter.

What is claimed is:

1. A device in connection with ship log based on measurement of the true values of the dynamic pressure in avoidance of errors introduced by reduction in pressure due to the boundary layer of water which is dragged along with the ship when the ship moves through the water by reason of the friction against the ship's hull, comprising a small chamber secured to and extending outside the actual ship's hull below the water line and situated at the forepart of the ship, said chamber having an opening for letting in sea water turned mainly in the normal direction of movement of the ship, said opening being spaced from the ship's hull a distance greater than the thickness of the boundary layer at that location on the ship's hull so as to be subject to the true value of the dynamic pressure, said chamber having another opening extending through the ship's hull for connection of a piping for transmitting the dynamic pressure, and said chamber having at its forward end two flat walls, which form an angle in the order of 90°, the bisectional plane of which coincides with the center longitudinal bulkhead of the ship or with a plane, which is parallel to this bulkhead, or intersects the same or its extension along a horizontal line, the center of said opening for letting in sea water being in said bisectional plane.

2. A device according to claim 1, wherein said opening for letting in sea water tapers outwards in the direction towards the interior of said small chamber.

3. A device according to claim 1, wherein the orifice of said piping transmitting the dynamic pressure is directed upwards within said small chamber.

4. A device according to claim 1, wherein said small chamber consists of a steel construction formed by two pieces of angle bar welded together and to the plating outside the actual ship hull.

5. A device in connection with the ship log based on measurement of the true values of the dynamic pressure in avoidance of errors introduced by reduction in pressure due to the boundary layer of water which is dragged along with the ship when the ship moves through the water by reason of friction against the ship's hull, comprising a small chamber secured to and extending outside the actual ship's hull below the water line and situated at the forepart of the ship, said chamber having at its forward end two substantially flat walls which intersect to form an angle, the bisectional plane of which intersects the ship's hull along a substantially horizontal line which is parallel to the center line of the ship, said chamber having an opening along the edge formed by the intersection of said two walls, which opening is turned mainly in the normal direction of movement of the ship for letting in sea water, said opening being spaced from the ship's hull a distance greater than the thickness of the boundary layer at that location on the ship's hull so as to be subject to the true value of the dynamic pressure, said edge extending at an obtuse angle from the ship's hull, and said chamber having another opening extending through the ship's hull for connection of a piping for transmitting the true value of the dynamic pressure.

References Cited in the file of this patent

UNITED STATES PATENTS

| 2,590,521 | Dyche | Mar. 25, 1952 |

FOREIGN PATENTS

| 1,433 | Great Britain | 1882 |
| 998,460 | France | Sept. 26, 1951 |
| 699,939 | Great Britain | Nov. 18, 1953 |